Dec. 1, 1925.

F. F. FORSHEE 1,563,353

ELECTRIC COOKY BAKER

Filed Aug. 22, 1922

WITNESSES:
C. M. Cochran
N. M. Biebel

INVENTOR
Frank F. Forshee.
BY
Wesley E. Carr
ATTORNEY

Patented Dec. 1, 1925.

1,563,353

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

ELECTRIC COOKY BAKER.

Application filed August 22, 1922. Serial No. 583,601.

*To all whom it may concern:*

Be it known that I, FRANK F. FORSHEE, a citizen of the United States, and a resident of Flint, in the county of Genesee and State of Michigan, have invented a new and useful Improvement in Electric Cooky Bakers, of which the following is a specification:

My invention relates to electrically-heated apparatus and, particularly, to electrically-heated cooky bakers.

The object of my invention is to provide a relatively simple and rugged electrically-heated device for baking cookies.

In practicing my invention, I provide a plurality of electrically-heated superposed casings, each casing having a baking surface removably associated therewith. A plurality of sets of three baking surfaces, each having the same surface configuration thereon, are provided to permit of the utilization of a new method of baking cookies.

Means are provided to permit of moving the upper casing relatively to the lower casing.

In the single sheet of drawings.

Figure 1:
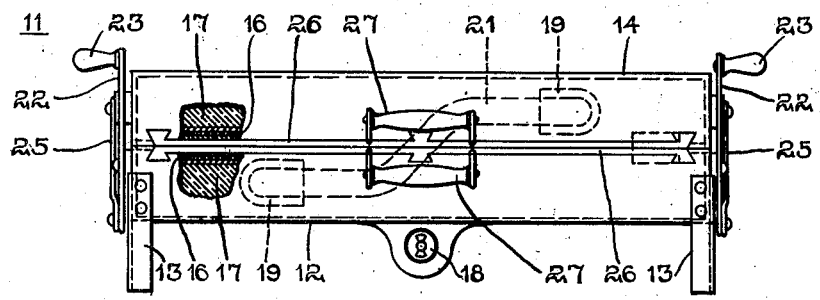
Figure 1 is a view, in front elevation, of a device embodying my invention.

A cooky baker, designated generally by the numeral 11, comprises a lower casing 12 provided with a plurality of supporting members 13, an upper casing 14 and a plurality of hinges 15 operatively connecting the two casings. Heating elements 16, of any suitable or desired construction, are provided adjacent one surface of each of the casings 12 and 14, and a quantity 17 of a suitable heat-insulating material is placed between the respective heating elements and the opposite walls of the casings. A switch 18 may be supported from the lower casing in order to permit of controlling the energization of the heating elements 16.

Hollow socket members 19 are provided at the hinge side of each of the casings, and a flexible armored conduit 21 has its respective ends extending into the hollow socket members 19 to permit of placing therein a suitable electric conductor for electrically connecting the heating elements in the upper and in the lower casings.

Figure 2:
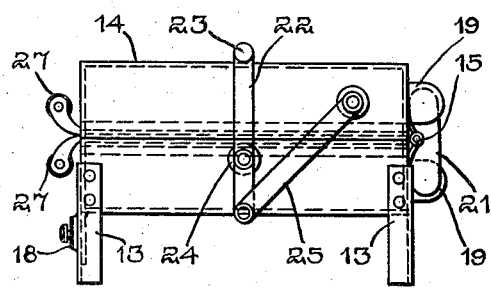
Fig. 2 is a view, in end elevation, thereof.

Means for varying the angular position of the upper casing relatively to the lower casing comprises a lever 22 at each end of the casings having an operating handle 23 secured thereto at one end thereof. The levers 22 are pivotally mounted on the lower casing intermediate their ends on a suitable member 24 secured to the casing wall. The lower end of each lever is pivotally connected to a link member 25 which has its other end pivotally connected to the upper casing substantially as illustrated in Fig. 2 of the drawing. When the handle member 23 is moved forwardly and downwardly, the upper casing 14 is raised to a substantially vertical position relatively to the lower casing.

Baking surfaces 26 are removably associated with each of the two casings and are provided, at their front edges, with suitable handle members 27 to permit of removing the baking surfaces from the casings or of replacing them thereon. Means for securing the baking surfaces 26 in proper operative positions relatively to the respective casings and the heating elements located therein, may comprise a dovetail construction substantially as illustrated in Fig. 1 of the drawings. The projecting or dovetail portion may be made integral with the baking surface, which is otherwise made of relatively thin metal in order to reduce the thermal capacity of the baking surfaces to a relatively small amount. In order to permit of quick and easy insertion, the width of the baking surfaces may be made less at that edge which is normally located adjacent the rear sides of the casings.

A plurality of sets of three baking surfaces, all of which have substantially the same surface configuration, are supplied, the co-operating pairs of baking surfaces of different sets, therefore, permitting of shaping the dough to form a predetermined shape or outline of cookies. The method of operation of my device is substantially as follows: the baking surface 26, which is to be operatively associated with the upper casing, is placed in its proper operative position therein, and the heating elements in the two casings are energized in order to bring the device to its proper operating temperature. One of the other two baking surfaces is filled with dough, placed in the various molded or pressed portions of its surface, and is then placed in its proper operative position in the lower casing, the upper casing having been raised. The upper casing is then lowered to substantially the position illustrated in Figs. 1 and 2 of the drawing, and the baking operation is completed with an ordinary cooky in a few minutes. During this time, the proper amounts of dough are placed in the third baking surface preparatory to its being placed in the lower casing after the upper casing is raised and the lower baking surface is removed from the lower casing. While the cookies of the second set are being baked, those of the first set may be removed from the baking surface, which is again filled with dough, and the process continued indefinitely.

Figure 3:
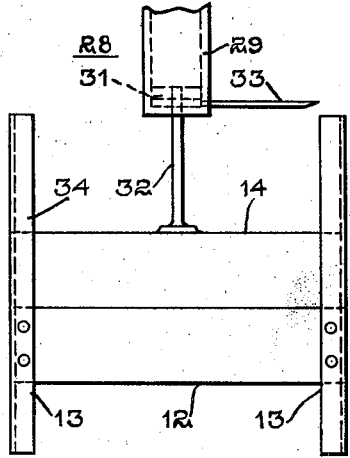
Fig. 3 is a view, in front elevation, of a modified form of device embodying my invention.

The modifications illustrated in Fig. 3 of the drawing comprises a lower casing 12 and an upper casing 14, which is provided with pneumatic position-controlling means 28, in order to raise the upper casing vertically instead of angularly relatively to the lower casing. A cylinder 29 may have located therein a piston 31 connected to a piston rod 32, the other end of which is secured to the top of the casing 14. A conduit 33 is suitably controlled by the operator and provided with an operating fluid which may be introduced below the piston 31 to raise the casing 14 and be permitted to escape therefrom to permit of lowering the casing. The guide members 34 may be provided to guide the upper casing in its up and down travel. The casings 12 and 14 are provided with removable baking surfaces and electric heating elements, as hereinbefore described in connection with the device illustrated in Figs. 1 and 2.

As it is intended that the width and length of the two casings shall be relatively great in order to provide a device which may be employed in bakeries where it is desired to bake large numbers of cookies, it is desirable to provide means to obtain a uniform temperature, not only over the entire surface of each of the baking surfaces but also between the upper and the lower casings. To this end, I provide a lesser number of heating elements in the upper casing than are provided in the lower casing. As the baking surface associated with the upper casing is not removed, it is evident that a lesser amount of electric energy is required in this casing than in the other.

Figure 4:
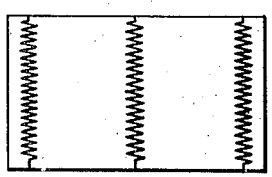
Figs. 4 and 5 are diagrammatic views of electric heating elements employed in the device embodying my invention.
Figure 5:
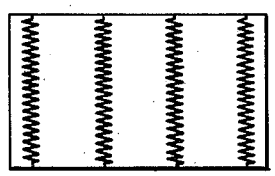

Fig. 4 illustrates diagrammatically the number of heating elements which may be provided in the upper casing, while Fig. 5 illustrates the number and general arrangement of the heating elements in the lower casing. As the lower casing receives the relatively cold baking surface and the dough contained therein, it is necessary to provide a greater amount of electric energy therefor. Radiation from the edge surfaces of the two casings is relatively large and it is, therefore, necessary, in order to provide a substantially uniform temperature over the entire surface of the baking surfaces, that a greater amount of energy be translated into heat adjacent the edges of the casings, and my invention contemplates heating elements so constructed and disposed within the respective casings as to effect the uniform heat distribution necessary to bake all of the cookies uniformly.

Various modifications may be made in my invention without departing from the spirit and scope thereof, and I desire, therefore, to be limited only by the scope of the appended claims.

I claim as my invention:—

1. In an electrical cooking device, in combination, a lower casing, an upper casing movable relatively to said lower casing, electrical-heating elements in each of said casings, and baking surfaces and removably associated with each of said casings and having interfitting engagement therewith.

2. In an electrical cooking device, in combination, a lower casing, an upper casing movable relatively to said lower casing, electri-heating elements in each of said casings, a baking surface operatively secured to said upper casing, and a plurality of baking surfaces to be removably and alternately operatively associated with the lower of said casings, all of said baking surfaces having substantially the same surface configuration.

3. In an electrically-heated cooking device, in combination, a lower casing, an upper casing movable relatively to the lower casing, a baking surface operatively associated with the upper casing, a plurality of baking surfaces alternately and removably associated with said lower casing, and heating elements in each of said casings, the heating element in the lower casing being of larger capacity than the heating element in the upper casing to substantially equalize the heat imparted to material placed on the lower baking surfaces, by the two co-operating heated baking surfaces.

4. In an electrical cooking device, in combination, a lower casing, an upper casing movable relatively to said lower casing, baking surfaces for each of said casings, heating elements in each of said casings so arranged therein that the two baking surfaces are heated uniformly over their entire surface.

5. In an electrical cooking device, in combination, a lower casing, an upper casing movable relatively to said lower casing, electric-heating means in each of said casings, baking surfaces operatively and removably associated with each of said casings and means on each of said baking surfaces for co-operating with the casing in which it is located for preventing buckling of the baking surface.

6. In an electrically heated cooking device, the combination with a pair of co-operating electrically heated casings, of removable baking surfaces for said casings having dove-tailed connection therewith.

7. In an electrically heated cooking device, the combination with a pair of co-operating electrically heated casings, of baking surfaces for said casings having dove tailed connection therewtih and removable therefrom by a movement laterally thereof.

In testimony whereof, I have hereunto subscribed my name this fourth day of Aug., 1922.

FRANK F. FORSHEE.